April 20, 1954     M. G. SCHORR     2,676,268
RADIATION MEASURING INSTRUMENT
Filed Dec. 2, 1950     3 Sheets-Sheet 1

Marvin G. Schorr
Inventor
by W. R. Hulbert
Attorney

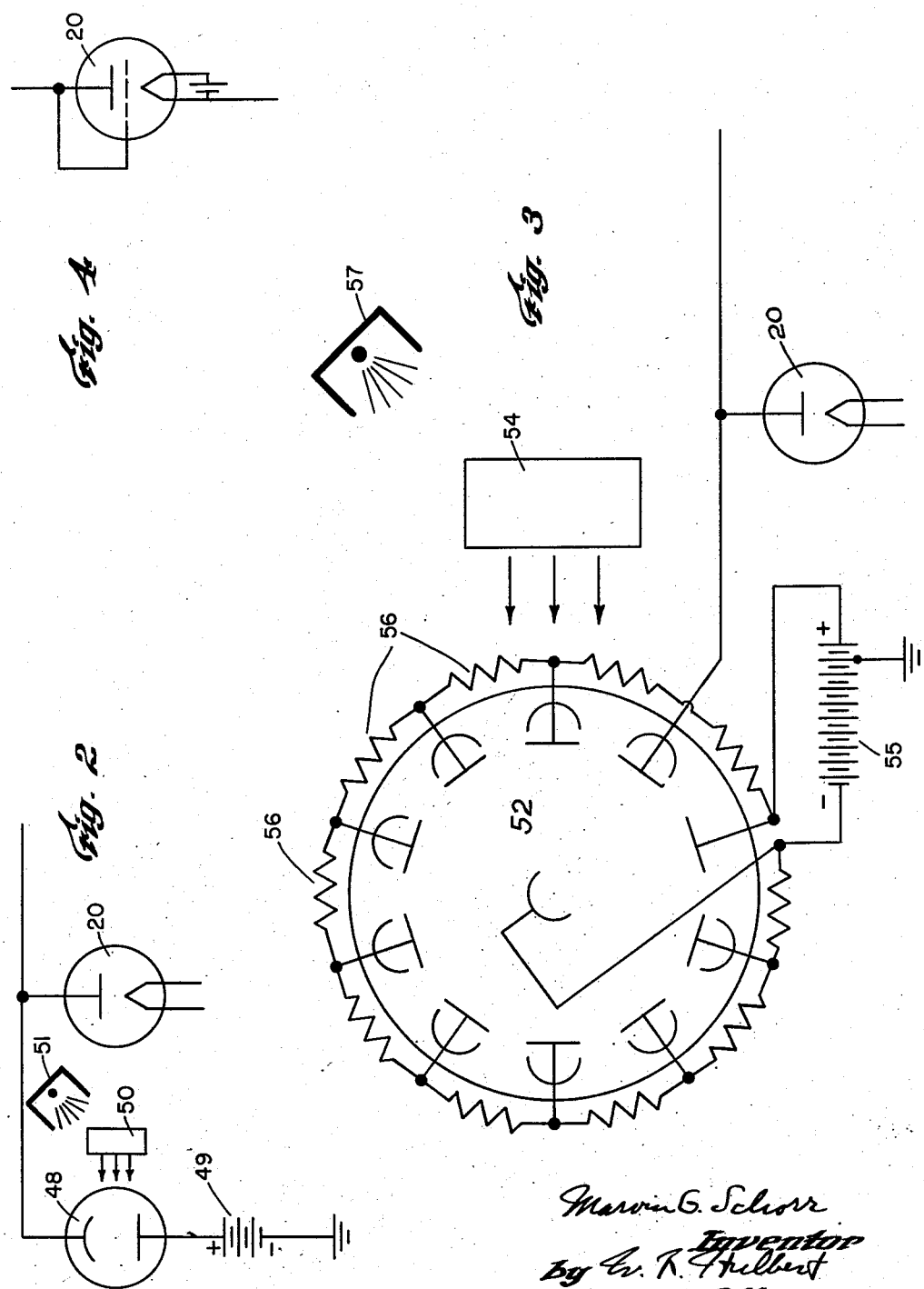

Patented Apr. 20, 1954

2,676,268

UNITED STATES PATENT OFFICE 2,676,268

RADIATION MEASURING INSTRUMENT

Marvin G. Schorr, Boston, Mass., assignor, by mesne assignments, to the United States of America as represented by the Secretary of the Army Application December 2, 1950, Serial No. 198,785

1 Claim. (Cl. 250—71)

This invention relates to detection of radiations such as emanate from radio-active materials. More particularly it is concerned with a new and improved measuring device for use in detecting a very wide range of radiation intensities on a single instrument, without the need for scale changers and the like, and in which the instrument response is a non-linear and preferably logarithmic function of the change in radiation intensity to which the device is subjected.

In the usual radiation detector, whether it be of the ion chamber or photo-tube type, the operation depends upon measuring the electric current produced by the chamber or photo-tube as a result of the irradiation. In most ion chambers or photo-tubes this output current is a linear function of the intensity of incident radiation.

For example, in an ion chamber type of instrument, there is usually provided a sensitive volume defined by a pair of electrodes across which is impressed a difference of electrical potential. The chamber is filled with an ionizing medium, usually an inert gas, and upon irradiation electrons will be knocked free from the atoms of the gaseous medium leaving the atoms or molecules as positively charged ions. With no charge on the electrodes the positive ions and free electrons will move about at random until they recombine to form stable neutral atoms again and no ionization current will be developed. However, with the impression of a voltage on the electrodes a collecting electric field is established within the chamber, causing the positive ions to migrate to the negatively charged electrode where their charges may be neutralized. As the value of the voltage impressed is increased, the recombination effects noted above become progressively less until a sufficiently strong field is established to discourage recombination entirely. At this point the ions are swept out of the field immediately upon formation and the ionization current developed is said to have reached a saturation value which is independent of additional voltage increments applied to the electrodes over a wide range. It is in this characteristic saturated region, yielding a so-called saturation current, that most ion chamber radiation measuring devices are usually operated, for in this region the magnitude of the chamber current or response then depends almost entirely upon the intensity of the ionizing radiations to which the chamber is subjected, and such response will be virtually linear.

The same thing is true of photo-tube and photo-multiplier tube detectors, which depend upon the fluorescing of a phosphor subjected to radiations, the phosphor being so positioned with respect to the tube that the scintillations thereof when irradiated will activate the tube, again yielding a linear response.

It is evident that if a radiation measuring device employing one of the above described detectors were designed for operation over an intensity range of say one milliroentgen per hour (1 mr./hr.) through one million milliroentgens per hour (1,000,000 mr./hr.), the detecting element would give a current output which would vary by a factor of a million to one, since the response would be linear. Consequently, in order to provide reasonable reading accuracy, the output meter would have to be equipped with a scale changer, dividing the operating range into, for example, six separate ranges.

In accordance with the present invention, I have discovered that the foregoing difficulties may be overcome and the need for scale changers completely eliminated by the new and improved radiation measuring instrument hereinafter described in which the output bears a non-linear and preferably logarithmic relation to the intensity of incident radiation.

It is accordingly an object of the present invention to provide a new and improved radiation measuring device whose response will be a non-linear and preferably logarithmic function of incident radiation intensity.

It is a further object of the invention to provide an improved device of the type described which may be employed in measuring with accuracy radiations varying widely in intensity without the need for scale changers or the like.

With the foregoing and other objects in view, the invention is featured by the provision, in combination, of a radiation detector whose current output varies preferably as a linear function of the intensity of incident radiation, a diode-type vacuum tube connected in series with the detector, the characteristics of the tube being such that the voltage drop across the same will be a logarithmic function of the current passing therethrough, and an electrometer for measuring such voltage drop.

In one embodiment of the invention I have employed as the radiation detector an ion chamber operated at saturation level. In another embodiment I have employed a detector comprising a photo-tube and associated phosphor. In still another embodiment I have used for the detector a photo-multiplier tube and associated phosphor. In each of these embodiments the detector will yield an output current varying as a linear function of the intensity of incident radiation.

Still other objects, advantages and features of the invention will become apparent from the following detailed description of preferred embodiments thereof, taken in connection with the accompanying drawings, in which like numerals refer to like parts in the several views, and in which, Fig. 1 is a circuit diagram showing an ion chamber type of radiation measuring device in accordance with the invention;

Fig. 2 is a fragmentary view showing the first stage of a measuring device similar to that shown in Fig. 1, in which a photo-tube and phosphor have been substituted for the ion chamber;

Fig. 3 is another fragmentary view, similar to Fig. 2, in which the detector consists of a photomultiplier tube and phosphor;

Fig. 4 is a diagram indicating the proper connections for one type of diode-connected electron tube which may be used as the diode of the previous embodiments.

Figure 1:
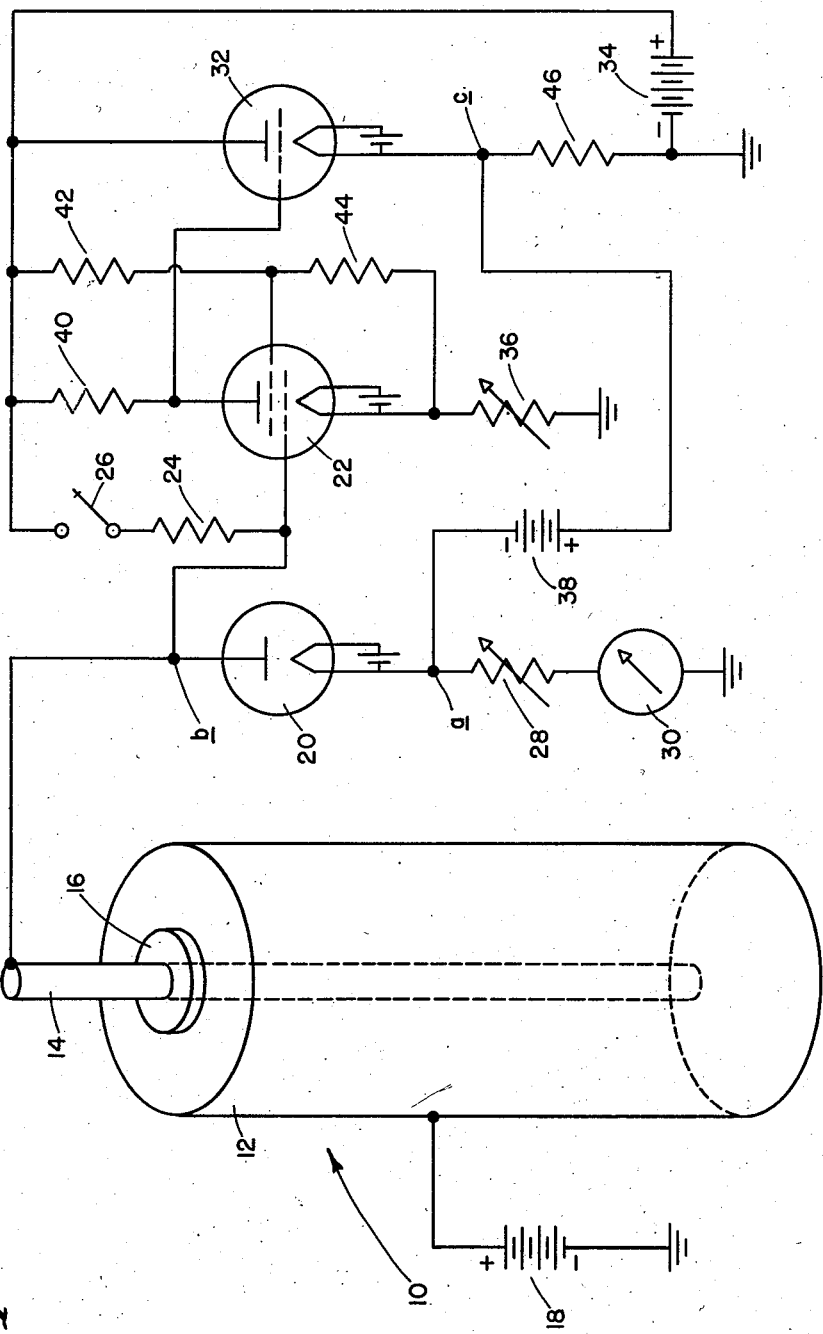

Referring first to Fig. 1, the radiation detector consists of an ion chamber 10 having an outer electrode or shell 12 and a central electrode 14 which projects through an insulating collar 16 in the top of the case. The outer electrode is connected to the positive side of a battery 18, the negative terminal of which is connected to ground. This battery is of sufficient strength to insure a saturation ionization current for the radiation intensities to be measured.

Under these conditions, the chamber current is linearly proportional to the radiation energy absorbed in the chamber. This current then must flow either through the diode 20, the grid of the tetrode 22, or the resistor 24. In normal operation the grid current of the tube 22 is negligible compared with chamber current, and the switch 26 is normally open; consequently all the chamber current flows to ground through the diode 20, a sensitivity resistor 28 and a microammeter 30. Since the resistance of the resistor 28 plus the resistance of the meter 30 is negligible compared to the effective resistance of the diode 20, the chamber current results in no significant voltage drop between the point in the circuit marked $a$ and the ground.

Under these conditions, the voltage drop across the tube 20 is related to the current through the tube by the formula $$V_{20} = \frac{kT}{e} \ln \frac{I}{I_0}$$

in which $V_{20}$=the voltage drop across the tube 20, $k$=Boltzmann's constant, $T$=Kelvin temperature, $e$=the charge of the electron, $I$=the current through the tube 20, and $I_0$=the current when $V_{20}$=0.

The voltage drop $V_{20}$ is then measured by a feedback electrometer circuit consisting of the tubes 22 and 32, and associated equipment, as shown in the drawings. An increase in chamber current increases the voltage at the point marked $b$, resulting in a decrease in the plate voltage of the tube 22, which is operated as a tetrode electrometer to reduce grid current. This drop in potential of the plate of the tube 22 forces the cathode of the cathode follower 32 to go negative, which results in point $a$ going negative and the meter 30 deflecting. Since point $b$ has gone positive and point $a$ has gone negative, the net voltage from $b$ to ground is almost unchanged. The technique of this feedback circuit is known in the art and results in great stability against drifting batteries as well as tube and resistor changes. The output voltage change from $a$ to ground is made very nearly equal and opposite to that change across the diode 20, and the relation is little affected by circuit variations.

In order to calibrate the instrument, a known current is passed through the diode by closing the switch 26. Since the voltage from point $b$ to ground does not vary in this circuit, and since the diode voltage drop is small compared to the strength of the battery 34, the current through the diode is very nearly $E/R$, in which $E$=the voltage of the battery 34 and $R$=the resistance of the resistor 24. The resistor 36 is utilized to set the current through the meter 30 at the correct value, corresponding to the calibration current through the diode. The resistor 28 sets the slope of the diode voltage-output voltage relation to allow a given current change through the meter 30 to correspond to a particular voltage change across the diode 20.

The battery 38 provides a bucking current for the meter 30 so that the latter will read only changes in diode voltage; and this battery 38 also serves to reduce the potential at point $c$ in the circuit to that required to close the feedback loop at point $a$.

By way of illustration, typical values of the circuit components may be—

Resistor 24=$10^{10}$ ohms
Resistor 28=$10^4$ ohms
Resistor 36=$2 \times 10^4$ ohms
Resistor 40=100 megohms
Resistor 42=$4 \times 10^5$ ohms
Resistor 44=$4 \times 10^4$ ohms
Resistor 46=$2 \times 10^4$ ohms
Battery 34=45 volts
Battery 38=9 volts
Battery 18=135 volts
Tube 20=CK570AX (grid connected to plate)
Tube 22=CK571AX
Tube 32=CK522AX It will be apparent that the tube 20 may be any type of diode or other type of electron tube which is convertible into a diode by suitable connections and having the characteristics of an emission limited vacuum tube diode operated in the retarding field region. The proper connections for the CK570AX are shown in the fragmentary view of Fig. 4.

Requisite characteristics for the diode must be such that the logarithmic relation given by the previously given formula prevails between its current and voltage. For this to be true, leakage current should be very low between the two ends, and the voltage drop across the filament should also be low.

Furthermore, it will also be apparent that other instruments and circuits may be used for measuring the voltage drop across the diode, provided only that such instrument or circuit requires an input current appreciably less than that which it is desired to measure. Thus it is possible, within the scope of the invention, to employ the more usual non-feedback vacuum tube electrometer circuit or a quartz fiber electrometer.

Referring now to the remaining figures of the drawing, in Fig. 2 I have shown the proper connections for employing as a radiation detector a photo-tube 48 having a phosphor 50 to produce scintillations when bombarded by radiations from a source 51. The output of the photo-tube is connected through the diode 20 in the same manner as before. The anode of the tube is connected to the positive side of a 90 v. battery 49, the negative side of which is grounded.

In Fig. 3 there has been shown a photo-multiplier tube 52, having a phosphor 54, with the output again connected to the plate of the diode 20. The photo-cathode is connected to the negative terminal of a 900 volt battery 55 and the collector is connected to the other side of the battery. The last dynode is connected to the plate of the diode. The battery is grounded at a point 90 v. from the positive end. The dynodes may be connected to each other through 1 meg. resistors 56. Radiations are shown emanating from a source 57.

Figure 5:
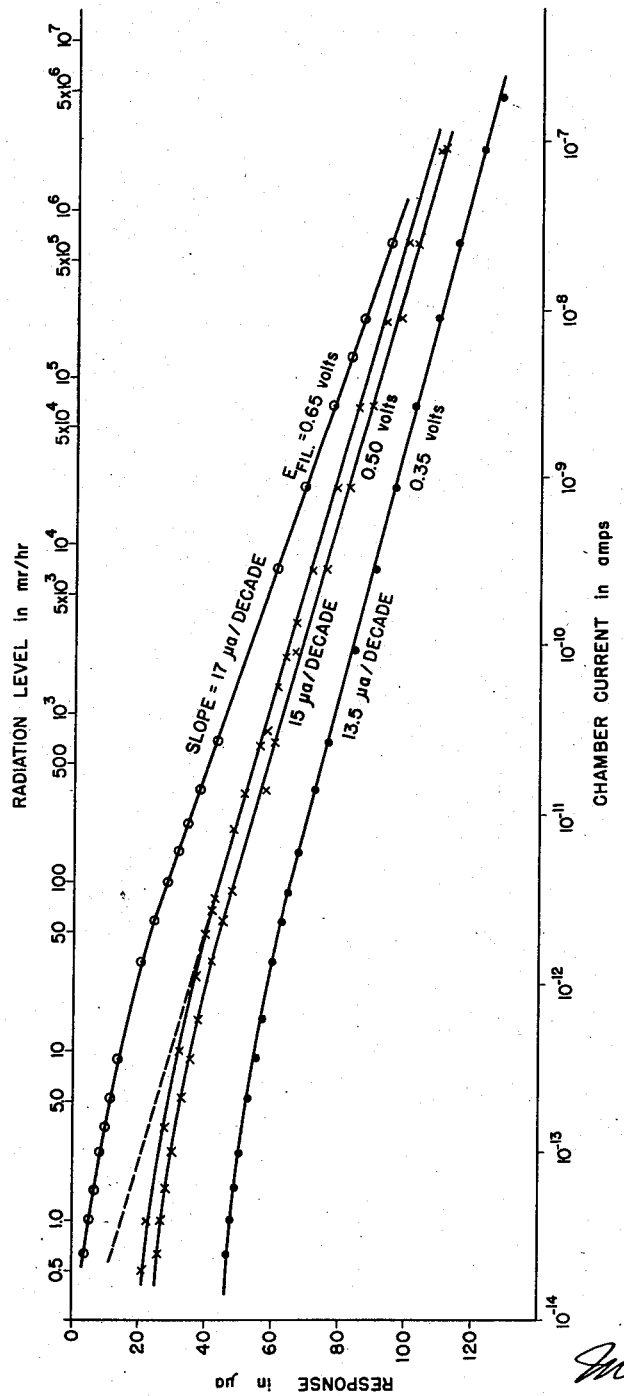
Fig. 5 is a graph showing typical results for radiations of various intensities using the apparatus of the invention.

Turning now to the graph shown in Fig. 5, there has been shown the results for three different values of voltage applied to the filament of the tube 20. It will be observed that the response is an excellently linear function of the logarithm of the radiation intensity between $10^{-7}$ and $10^{-12}$ amperes, corresponding respectively to 3000 r./hr. and 30 mr./hr., using a 500 cc. ion chamber. For currents below $10^{-12}$ amperes or radiations below 30 mr./hr., the curves show deviations from straight lines. These deviations may be explained by a leakage current of about $10^{-13}$ amperes. There seems no reason why the straight line portions should not extend to lower current levels, provided that leakage currents may be reduced.

The results of the device according to the invention show basically a truly logarithmic response, thus facilitating calibration and making unnecessary the use of scale changers on the instrument. A definite advantage also accrues in that the effective resistance of the diode employed is inversely related to the current passing through it, so that the time response of the diode voltage is relatively long at low currents, where it is desired to smooth statistics and decrease rapidly at large currents, where it is desirable to achieve a rapid response, and where statistical fluctuations are not of significance.

While I have herein disclosed preferred embodiments of the invention, it will be understood that modifications and changes in the same may occur to persons skilled in the art within the spirit and scope of the appended claim.

I claim:

A radiation measuring device yielding an indication which will vary as a logarithmic function of changes in the intensity of incident radiation, which comprises: a detector of radiations whose output is an electric current varying as a linear function of the intensity of incident radiation, a resistor and a current meter connected in series with said detector, a diode-connected electron tube connected between said detector and said resistor in series therewith, a second electron tube having a grid connected to the anode of said diode, and a cathode follower circuit responsive to fluctuations of voltage on the grid of said second tube and connected in feedback relation to the cathode of said diode for impressing a voltage change across said resistor and meter equal and opposite to the voltage change across said diode corresponding to changes in radiation intensity and as a logarithmic function thereof.

References Cited in the file of this patent

UNITED STATES PATENTS

| Number | Name | Date |
|---|---|---|
| 2,368,351 | Ewen | Jan. 30, 1945 |
| 2,383,478 | Friedman et al. | Aug. 28, 1945 |
| 2,465,938 | Shonka | Mar. 29, 1949 |
| 2,517,404 | Morton | Aug. 1, 1950 |
| 2,524,904 | Fox | Oct. 10, 1950 |
| 2,531,804 | Carlin | Nov. 28, 1950 |
| 2,536,517 | Weller | Jan. 2, 1951 |
| 2,554,933 | Wouters | May 29, 1951 |

OTHER REFERENCES

"Design and Application of a Logarithmic Amplifier," Johnstone, A. E. C. U.—363, published by Technical Information Branch, Oak Ridge, Tenn., Sept. 14, 1949, pages 1–5.